US011919293B2

(12) United States Patent
Yoda

(10) Patent No.: US 11,919,293 B2
(45) Date of Patent: Mar. 5, 2024

(54) RECORDING DEVICE

(71) Applicant: SEIKO EPSON CORPORATION, Tokyo (JP)

(72) Inventor: Tomohiro Yoda, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/809,487

(22) Filed: Jun. 28, 2022

(65) Prior Publication Data

US 2022/0410598 A1 Dec. 29, 2022

(30) Foreign Application Priority Data

Jun. 29, 2021 (JP) ................................. 2021-107557

(51) Int. Cl.
*B41J 11/00* (2006.01)
*B41F 23/04* (2006.01)
*B41J 2/045* (2006.01)

(52) U.S. Cl.
CPC ..... *B41J 11/00222* (2021.01); *B41F 23/0466* (2013.01); *B41J 2/04553* (2013.01)

(58) Field of Classification Search
None
See application file for complete search history.

(56) References Cited

U.S. PATENT DOCUMENTS

2009/0243527 A1* 10/2009 Kakiuchi .............. F24F 3/1405 318/434
2015/0345787 A1* 12/2015 Kim ........................ F23N 1/042 431/18
2018/0272754 A1* 9/2018 Matsuoka ............ B41J 11/0024
2019/0001707 A1* 1/2019 Yoda .................. B41J 11/00216

FOREIGN PATENT DOCUMENTS

JP 11-207943 8/1999

* cited by examiner

*Primary Examiner* — Scott A Richmond
(74) *Attorney, Agent, or Firm* — WORKMAN NYDEGGER

(57) ABSTRACT

A recording device includes: a recording unit configured to perform recording by liquid to a recording medium; a support unit configured to support the recording medium subjected to printing and transported in a transport direction; a drying mechanism including a heated air blower including a heat source and a blowing unit; a number of rotations detecting unit configured to detect a number of rotations of the blowing unit; and a control unit configured to control the drying mechanism. The support unit and the heated air blower are disposed sandwiching a transport path of the recording medium at a position downstream of the recording unit in the transport direction. The control unit controls the number of rotations of the blowing unit based on an output of the number of rotations detecting unit in a state in which a constant power is applied to the heat source.

7 Claims, 6 Drawing Sheets

RECORDING DEVICE

The present application is based on, and claims priority from JP Application Serial Number 2021-107557, filed Jun. 29, 2021, the disclosure of which is hereby incorporated by reference herein in its entirety.

BACKGROUND

1. Technical Field

The present disclosure relates to a recording device such as a printer.

2. Related Art

For example, as in JP-A-11-207943, there is a printer that is an example of a recording device that performs printing by causing ink that is an example of liquid to adhere to a printing sheet that is an example of a recording medium. The printer includes a dryer that is an example of a heated air blower, and a control circuit that is an example of a control unit that controls the dryer. The dryer blows hot air to dry the ink adhering to the printing sheet. The control circuit controls the voltage applied to the dryer to control the temperature and the air flow rate of the hot air.

For example, when the heated air blower is controlled by voltage, the temperature of the wind supplied by the heated air blower may vary due to individual differences among heated air blowers. When the temperature of the wind is low, such wind may be unable to sufficiently dry the liquid adhering to the recording medium. However, when the temperature of the wind is high, such wind may evaporate the moisture held in the recording medium, causing wrinkles on the recording medium.

SUMMARY

A recording device that solves the problems described above includes: a recording unit configured to perform recording by causing liquid to adhere to a recording medium, a support unit configured to support the recording medium subjected to printing and transported in a transport direction, a drying mechanism including a heated air blower including a heat source and a blowing unit, a number of rotations detecting unit configured to detect a number of rotations of the blowing unit that blows air to the heat source, and a control unit configured to control the drying mechanism, wherein the support unit and the heated air blower are disposed sandwiching a transport path of the recording medium at a position downstream of the recording unit in the transport direction and the control unit controls the number of rotations of the blowing unit based on an output of the number of rotations detecting unit in a state in which a constant power is applied to the heat source.

DESCRIPTION OF EXEMPLARY EMBODIMENTS

Figure 1:
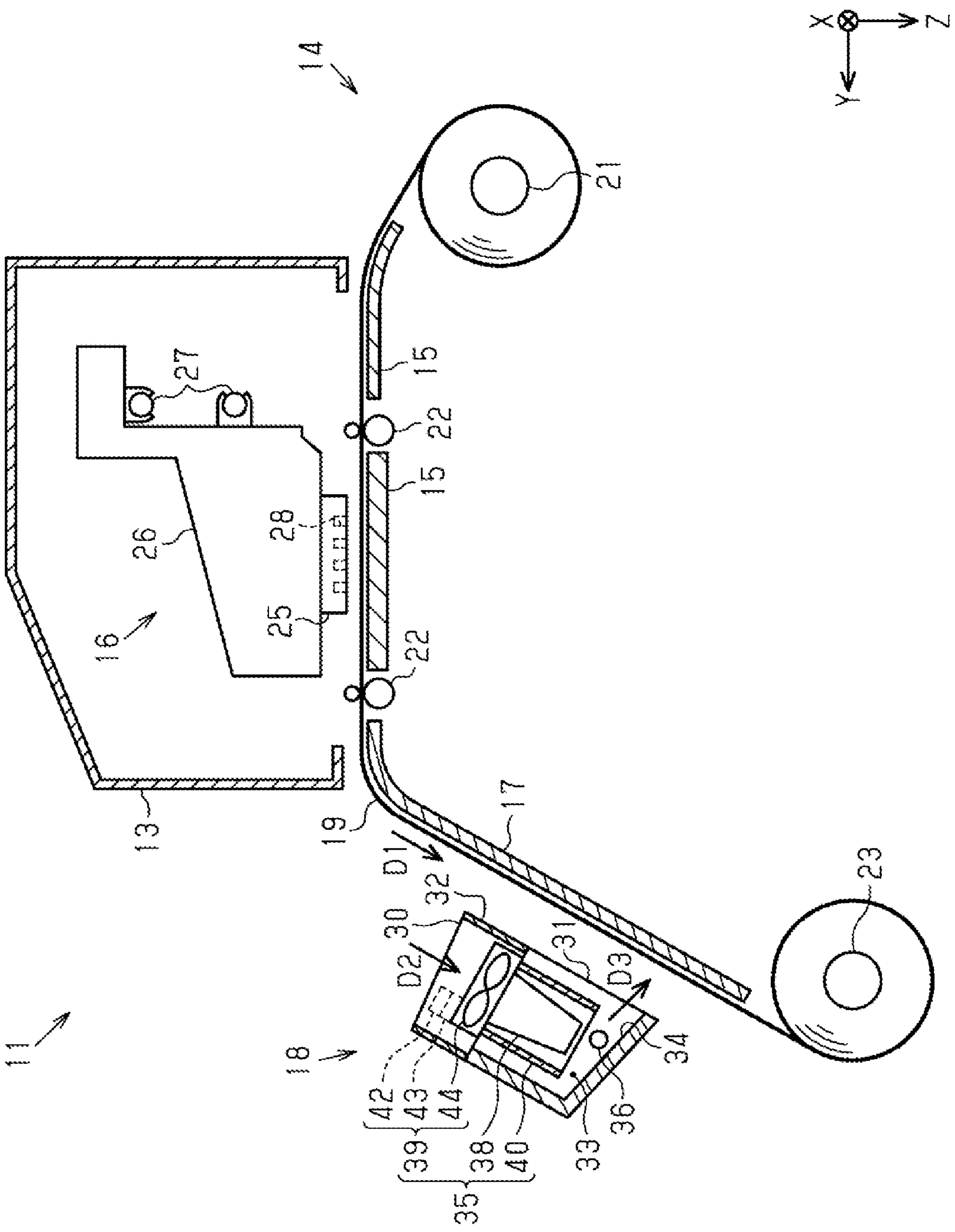
FIG. 1 is a schematic cross-sectional view illustrating an embodiment of a recording device.

Hereinafter, an embodiment of a recording device will be described with reference to the drawings. A recording device is, for example, an inkjet printer that records an image of characters, photographs, and the like on a recording medium such as a sheet by ejecting ink that is an example of liquid.

In the drawings, assuming that a recording device 11 is placed on a horizontal surface, the direction of gravity is indicated by the Z-axis, and directions along the horizontal surface are indicated by the X-axis and the Y-axis. The X-axis, the Y-axis, and the Z-axis are orthogonal to each other. In the following description, a direction parallel to the X-axis is also referred to as the width direction X.

As illustrated in FIG. 1, the recording device 11 may include a housing 13, a transport unit 14, and a guide unit 15. The recording device 11 includes a recording unit 16, a support unit 17, and a drying mechanism 18.

Transport Unit

The transport unit 14 transports a recording medium 19 in a transport direction D1. The transport direction D1 of the present embodiment is a direction along the guide unit 15 and the support unit 17, and is a direction intersecting the width direction X. The guide unit 15 guides the recording medium 19 subjected to recording by the recording unit 16, and the recording medium 19 to be subjected to recording. The support unit 17 supports the recording medium 19 subjected to printing and transported in the transport direction D1. In the drawings, the recording medium 19 is illustrated as being separated from the support unit 17 and the guide unit 15. However, the recording medium 19 is transported in a state of being in contact with and being slidably supported by the support unit 17 and the guide unit 15.

The transport unit 14 may include a feeding shaft 21, a transport roller 22, and a winding shaft 23. The transport unit 25 may include a plurality of transport rollers 22. The feeding shaft 21 and the winding shaft 23 rotatably support a roll around which a long recording medium 19 is wound to form a cylindrical shape.

The feeding shaft 21 is located upstream of the transport roller 22 in the transport direction D1. The feeding shaft 21 rotates to unwind and feed the wound recording medium 19. The transport roller 22 transports the fed recording medium 19 along the guide unit 15 and the support unit 17. The winding shaft 23 is located downstream of the transport roller 22 in the transport direction D1. The winding shaft 23 rewinds the transported recording medium 19.

Recording Unit

The recording unit 16 performs recording by causing liquid to adhere to the recording medium 19. The recording unit 16 of the present embodiment is of a serial type that performs printing while moving in the width direction X of the recording medium 19. The recording unit 16 may be constituted as a line type provided across the width direction X of the recording medium 19.

The recording unit 16 may include a liquid ejecting head 25, a carriage 26, and a guide shaft 27. The liquid ejecting head 25 includes a plurality of nozzles 28 that eject liquid. The recording unit 16 may include a plurality of guide shafts 27 provided in parallel with the X-axis. The guide shaft 27 guides the movement of the carriage 26. The carriage 26 holds the liquid ejecting head 25, and causes the liquid ejecting head 25 to reciprocate along the guide shaft 27. The liquid ejecting head 25 performs recording on the recording medium 19 by ejecting liquid toward the recording medium 19 while moving.

Drying Mechanism

The drying mechanism 18 dries the liquid adhering to the recording medium 19 by exposing the recording medium 19 to heated wind.

The drying mechanism 18 may include a flow path member 32 including an intake port 30 and an exhaust port 31. The flow path member 32 forms a compartment 33. In other words, the drying mechanism 18 may include the compartment 33. The intake port 30 and the exhaust port 31 open to the compartment 33. The compartment 33 may include a turning surface 34.

The drying mechanism 18 includes a heated air blower 35. The recording device 11 may include a temperature detecting unit 36 that detects the temperature of the wind supplied by the heated air blower 35. The compartment 33 houses the heated air blower 35 and the temperature detecting unit 36.

The support unit 17 and the heated air blower 35 are disposed sandwiching a transport path of the recording medium 19 at a position downstream of the recording unit 16 in the transport direction D1. Since the recording medium 19 of the present embodiment is long, the recording medium 19 is located in the transport path during recording. Accordingly, the heated air blower 35 faces the recording medium 19 supported by the support unit 17. Specifically, since the heated air blower 35 of the present embodiment is housed in the compartment 33, the heated air blower 35 faces the recording medium 19 via the exhaust port 31. To put it differently, the drying mechanism 18 faces the recording medium 19 at the exhaust port 31. In a state in which the recording medium 19 is not mounted on the recording device 11, the heated air blower 35 and the exhaust port 31 face the support unit 17.

The heated air blower 35 includes a heat source 38 and a blowing unit 39. The heated air blower 35 may include a cylinder 40 that covers the heat source 38. Providing the cylinder 40 allows the heat generated from the heat source 38 to be efficiently transferred to the gas supplied by the blowing unit 39.

The heat source 38 generates heat upon application of power. For the heat source 38, a nichrome heater, a Kanthal heater, a sheathed heater, or the like may be used.

The blowing unit 39 rotates to blow air to the heat source. Specifically, the blowing unit 39 may include a driving source 42 such as a motor, a power transmission unit 43, and a fan 44. The compartment 33 may house at least a portion of the heated air blower 35. In other words, a portion of the power transmission unit 43 and the driving source 42 may be disposed outside the compartment 33. The power transmission unit 43 transmits the driving force of the driving source 42 to the fan 44 to rotate the fan 44. Rotation of the fan 44 causes gas to flow, thereby causing wind. For the fan 44, a propeller fan, a sirocco fan, a turbo fan, or the like may be used.

The blowing unit 39 supplies the gas taken in from the intake port 30 in an air blowing direction D2. The air blowing direction D2 of the present embodiment is a direction parallel to the transport direction D1 at a position in which the drying mechanism 18 dries the recording medium 19. The intake port 30, the fan 44, the heat source 38, the temperature detecting unit 36, and the turning surface 34 may be aligned in the air blowing direction D2. The turning surface 34 is a surface that is inclined relative to the air blowing direction D2. The turning surface 34 changes the orientation of the wind supplied in the air blowing direction D2, and guides the wind to the exhaust port 31. The drying mechanism 18 supplies wind from the exhaust port 31 in an air blasting direction D3. The air blasting direction D3 of the present embodiment is a direction parallel to the turning surface 34.

Figure 2:
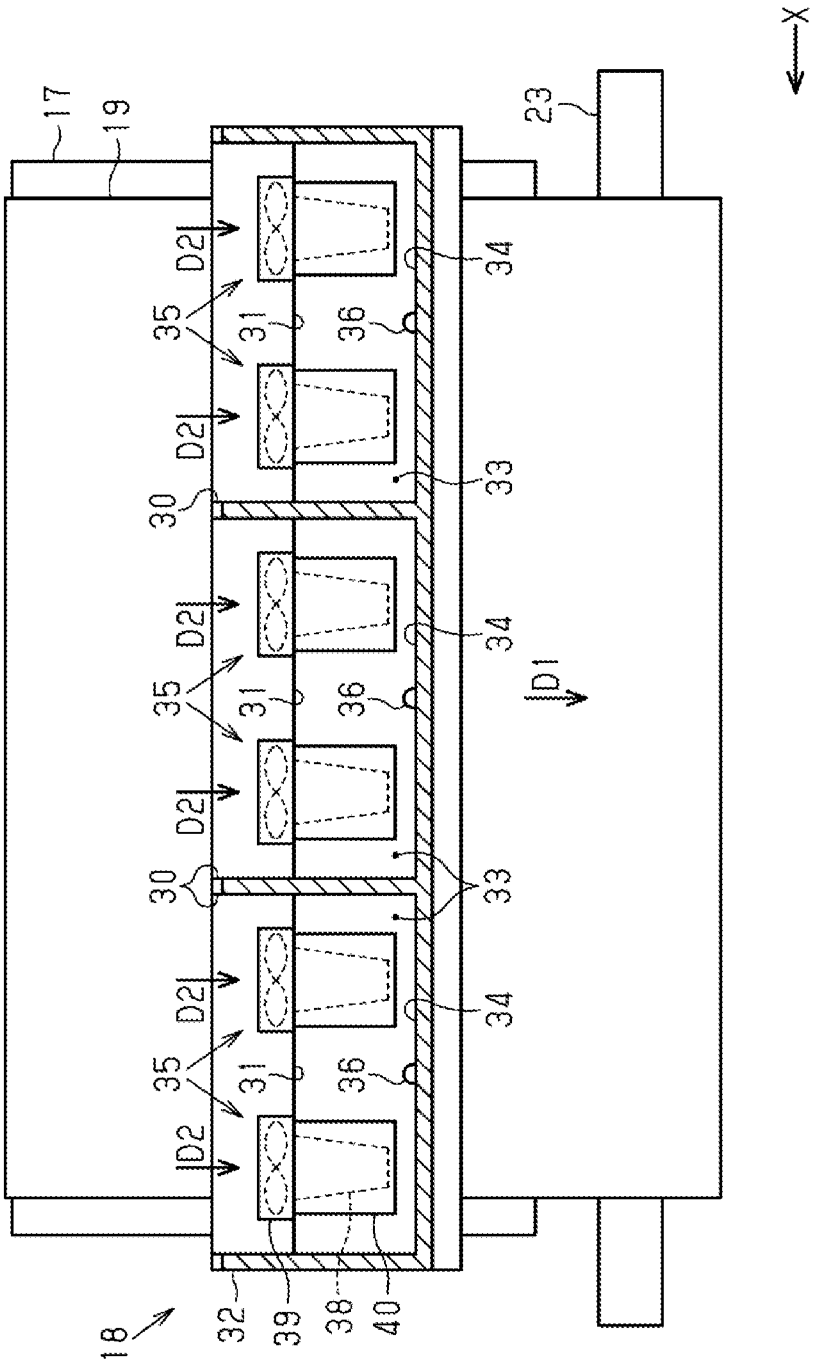
FIG. 2 is a schematic cross-sectional view illustrating a drying mechanism.

As illustrated in FIG. 2, the drying mechanism 18 may include a plurality of heated air blowers 35 aligned in the width direction X. The plurality of heated air blowers 35 may be aligned to form a row at equal intervals. The drying mechanism 18 may include a plurality of temperature detecting units 36. The drying mechanism 18 may include a plurality of compartments 33 aligned in the width direction X. Each of the plurality of compartments 33 may house a heated air blower 35 and a temperature detecting unit 36. Each of the plurality of compartments 33 may house a plurality of heated air blowers 35. In other words, one compartment 33 may house one heated air blower 35, or may house a plurality of heated air blowers 35. The number of heated air blowers 35 housed in one compartment 33 may be the same among the compartments, or may be different from one another. The recording device 11 of the present embodiment includes three compartments 33, with each of the compartments 33 housing two heated air blowers 35.

Figure 3:
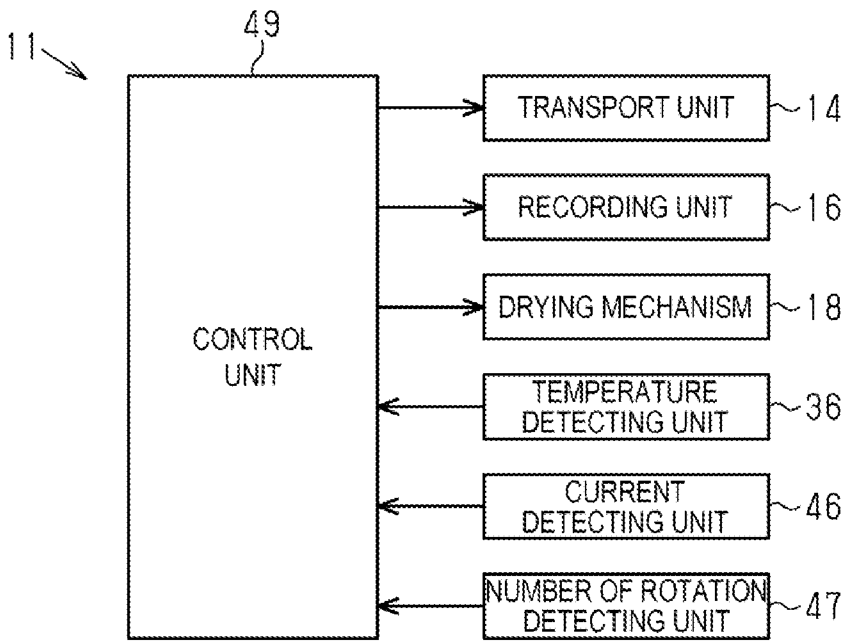
FIG. 3 is a block diagram illustrating a recording device.

As illustrated in FIG. 3, the recording device 11 may include a current detecting unit 46. The current detecting unit 46 detects the value of current flowing through the heated air blower 35. The recording device 11 includes a number of rotations detecting unit 47. The number of rotations detecting unit 47 detects the number of rotations of the blowing unit 39 that blows air to the heat source 38. The number of rotations detecting unit 47 may be a sensor that detects displacement of a blade included in the fan 44, or may be a rotary encoder that detects the number of rotations of any of the fan 44, the power transmission unit 43, and the driving source 42. The number of rotations detecting unit 47 may be constituted integrally with an object to be rotated. In other words, when the number of rotations detecting unit 47 detects the number of rotations of the driving source 42, the driving source 42 and the number of rotations detecting unit 47 may be integrally constituted.

Electrical Configuration

As illustrated in FIG. 3, the recording device 11 includes a control unit 49 that controls the drying mechanism 18. The control unit 49 may comprehensively control the driving of each of the mechanisms in the recording device 11, and control each of the operations executed in the recording device 11.

The control unit 49 can be constituted as a circuit including (α) one or more processors that execute various processing in accordance with a computer program, (β) one or more dedicated hardware circuits that execute processing of at least part of such various processing, or (γ) a combination thereof. The hardware circuit is, for example, an application-specific integrated circuit. The processor includes a central processing unit (CPU) and a memory such as a random access memory (RAM) and a read-only memory (ROM). The memory stores a program code or a command configured to cause the CPU to execute processing. The memory or a computer readable medium includes any readable medium accessible by a general purpose or dedicated computer.

TABLE 1

| Target temperature of wind | Applied power to heat source | Reference number of rotations of blowing unit |
|---|---|---|
| First target temperature (150° C.) | First applied power (2500 W) | First reference number of rotations (4500 rpm) |
| Second target temperature (140° C.) | First applied power (2500 W) | Second reference number of rotations (5000 rpm) |
| Third target temperature (135° C.) | Second applied power (2000 W) | First reference number of rotations (4500 rpm) |
| Fourth target temperature (130° C.) | Second applied power (2000 W) | Second reference number of rotations (5000 rpm) |

As illustrated in Table 1, the control unit 49 may store applied power applied to the heat source 38 and a reference number of rotations of the blowing unit 39 in association with a target temperature of wind. The target temperature may be set by the control unit 49 in accordance with the type of the recording medium 19, the amount of adhering liquid, or the like, or may be set by the user of the recording device 11.

The control unit 49 may store a first target temperature, a first applied power, and a first reference number of rotations in association with one another. The control unit 49 may store a second target temperature lower than the first target temperature, the first applied power, and a second reference number of rotations greater than the first reference number of rotations in association with one another. The control unit 49 may store a third target temperature lower than the second target temperature, a second applied power smaller than the first applied power, and the first reference number of rotations in association with one another. The control unit 49 may store a fourth target temperature lower than the third target temperature, the second applied power, and the second reference number of rotations in association with one another.

For example, the first target temperature is 150° C., the second target temperature is 140° C., the third target temperature is 135° C., and the fourth target temperature is 130° C. For example, the first applied power is 2500 W, and the second applied power is 2000 W. For example, the first reference number of rotations is 4500 rpm, and the second reference number of rotations is 5000 rpm.

Drying Routine

A drying routine will be described with reference to a flowchart illustrated in FIG. 4. The control unit 49 may execute the drying routine at a timing such as when the recording device 11 is powered on, when the drying mechanism 18 is powered on, when an instruction for recording is issued, when an instruction for drying is issued, or when the recording medium 19 is dried.

In step S101, the control unit 49 acquires the target temperature. In step S102, the control unit 49 applies the applied power corresponding to the target temperature to the heat source 38 to drive the heat source 38. In step S103, the control unit 49 applies current to the blowing unit 39 to drive the blowing unit 39. In step S104, the control unit 49 acquires the detected number of rotations, which is the number of rotations of the blowing unit 39 detected by the number of rotations detecting unit 47.

In step S105, the control unit 49 determines whether the detected number of rotations acquired in step S104 is smaller than a lower limit number of rotations. The lower limit number of rotations is a value smaller than the reference number of rotations corresponding to the target temperature by an allowable error, and is preset based on the reference number of rotations. For example, the lower limit number of rotations may be a value smaller than the reference number of rotations by a certain value, or may be a value smaller than the reference number of rotations by a certain ratio.

When the detected number of rotations is smaller than the lower limit number of rotations, the determination in step S105 is YES. Thus, the control unit 49 moves the processing to step S106. In step S106, the control unit 49 executes a subroutine for increasing the number of rotations illustrated in FIG. 5.

When the detected number of rotations is greater than or equal to the lower limit number of rotations, the determination in step S105 is NO. Thus, the control unit 49 moves the processing to step S107. In step S107, the control unit 49 determines whether the detected number of rotations acquired in step S104 is smaller than an upper limit number of rotations. The upper limit number of rotations is a value greater than the reference number of rotations corresponding to the target temperature by an allowable error, and is preset based on the reference number of rotations. For example, the upper limit number of rotations may be a value greater than the reference number of rotations by a certain value, or may be a value greater than the reference number of rotations by a certain ratio.

When the detected number of rotations is smaller than the upper limit number of rotations, the determination in step S107 is YES. Thus, the control unit 49 moves the processing to step S108. When the detected number of rotations is greater than or equal to the upper limit number of rotations, the determination in step S107 is NO. Thus, the control unit 49 moves the processing to step S111. In step S111, the control unit 49 executes a subroutine for decreasing the number of rotations illustrated in FIG. 6.

In step S108, the control unit 49 acquires a detected temperature detected by the temperature detecting unit 36. In step S109, the control unit 49 determines whether the detected temperature acquired in step S108 is higher than an upper limit temperature. The upper limit temperature is a temperature higher than the target temperature by an allowable error, and is preset based on the target temperature. For example, the upper limit temperature may be a temperature higher than the target temperature by a certain value, or may be a temperature higher than the target temperature by a certain ratio.

When the detected temperature is higher than the upper limit temperature, the determination in step S109 is YES. Thus, the control unit 49 moves the processing to step S106. When the detected temperature is less than or equal to the upper limit temperature, the determination in step S109 is NO. Thus, the control unit 49 moves the processing to step S110.

In step S110, the control unit 49 determines whether the detected temperature acquired in step S108 is higher than a lower limit temperature. The lower limit temperature is a temperature lower than the target temperature by an allowable error, and is preset based on the target temperature. For example, the lower limit temperature may be a temperature lower than the target temperature by a certain value, or may be a temperature lower than the target temperature by a certain ratio.

When the detected temperature is higher than the lower limit temperature, the determination in step S110 is YES. Thus, the control unit 49 moves the processing to step S104. When the detected temperature is less than or equal to the lower limit temperature, the determination in step S110 is NO. Thus, the control unit 49 moves the processing to step S111.

Subroutine for Increasing the Rotational Speed

Figure 5:
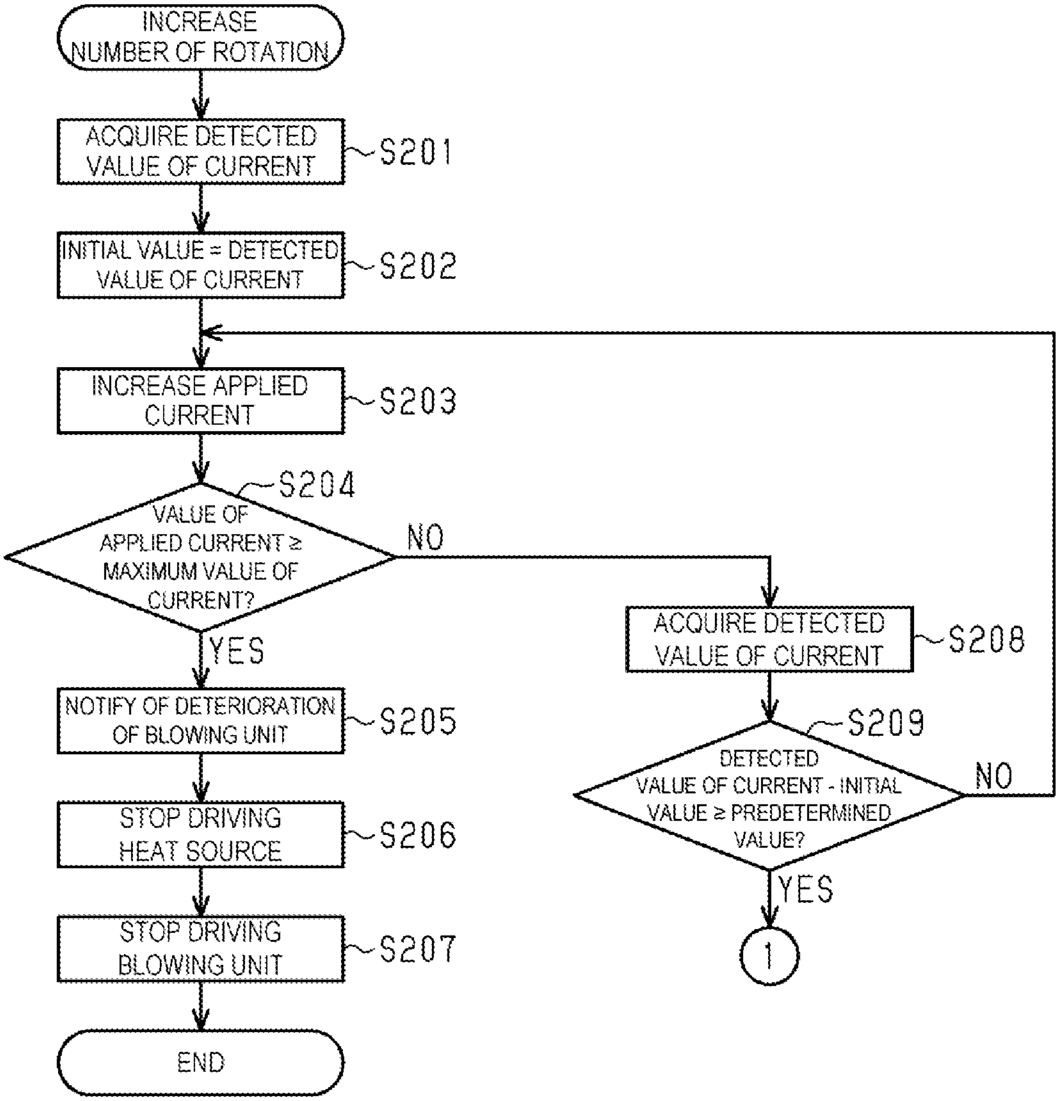
FIG. 5 is a flowchart illustrating a subroutine for increasing a number of rotations.

As illustrated in FIG. 5, in step S201, the control unit 49 acquires a detected value of current, which is the value of current flowing through the heated air blower 35 detected by the current detecting unit 46. In step S202, the control unit 49 stores the detected value of current acquired in step S201 as the initial value. In step S203, the control unit 49 increases the applied current applied to the blowing unit 39.

In step S204, the control unit 49 determines whether the value of applied current applied to the blowing unit 39 is greater than or equal to the maximum value of current. When the value of applied current is greater than or equal to the maximum value of current, the determination in step S204 is YES. Thus, the control unit 49 moves the processing to step S205.

In step S205, the control unit 49 notifies of deterioration of the blowing unit 39. For example, the control unit 49 may perform notification by causing a display unit (not illustrated) to display a message, a mark, or the like. In step S206, the control unit 49 stops driving the heat source 38. In step S207, the control unit 49 stops driving the blowing unit 39, terminating the subroutine for increasing the number of rotations and the drying routine.

In step S204, when the value of applied current is smaller than the maximum value of current, the determination in step S204 is NO. Thus, the control unit 49 moves the processing to step S208. In step S208, the control unit 49 acquires a detected value of current, which is the value of current flowing through the heated air blower 35 detected by the current detecting unit 46.

In step S209, the control unit 49 determines whether the difference between the detected value of current acquired in step S208 and the initial value set in step S202 is greater than or equal to a predetermined value. The predetermined value is a preset value.

When the difference between the detected value of current and the initial value is greater than or equal to the predetermined value, the determination in step S209 is YES. Thus, the control unit 49 terminates the subroutine for increasing the number of rotations, and moves the processing to step S104 of the drying routine illustrated in FIG. 4. When the difference between the detected value of current and the initial value is less than the predetermined value, the determination in step S209 is NO. Thus, the control unit 49 moves the processing to step S203.

Subroutine for Decreasing the Rotational Speed

Figure 6:
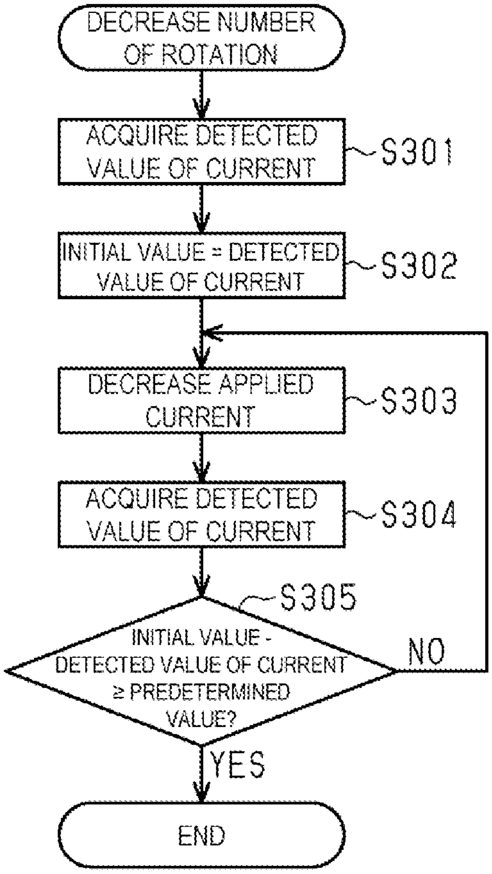
FIG. 6 is a flowchart illustrating a subroutine for decreasing a number of rotations.

As illustrated in FIG. 6, in step S301, the control unit 49 acquires a detected value of current, which is the value of current flowing through the heated air blower 35 detected by the current detecting unit 46. In step S302, the control unit 49 stores the detected value of current acquired in step S301 as the initial value. In step S303, the control unit 49 decreases the applied current applied to the blowing unit 39.

In step S304, the control unit 49 acquires a detected value of current, which is the value of current flowing through the heated air blower 35 detected by the current detecting unit 46. In step S305, the control unit 49 determines whether the difference between the detected value of current acquired in step S304 and the initial value set in step S302 is greater than or equal to a predetermined value. The predetermined value is a preset value.

When the difference between the detected value of current and the initial value is greater than or equal to the predetermined value, the determination in step S305 is YES. Thus, the control unit 49 terminates the subroutine for decreasing the number of rotations, and moves the processing to step S104 of the drying routine illustrated in FIG. 4. When the difference between the detected value of current and the initial value is less than the predetermined value, the determination in step S305 is NO. Thus, the control unit 49 moves the processing to step S303.

Action

Figure 4:
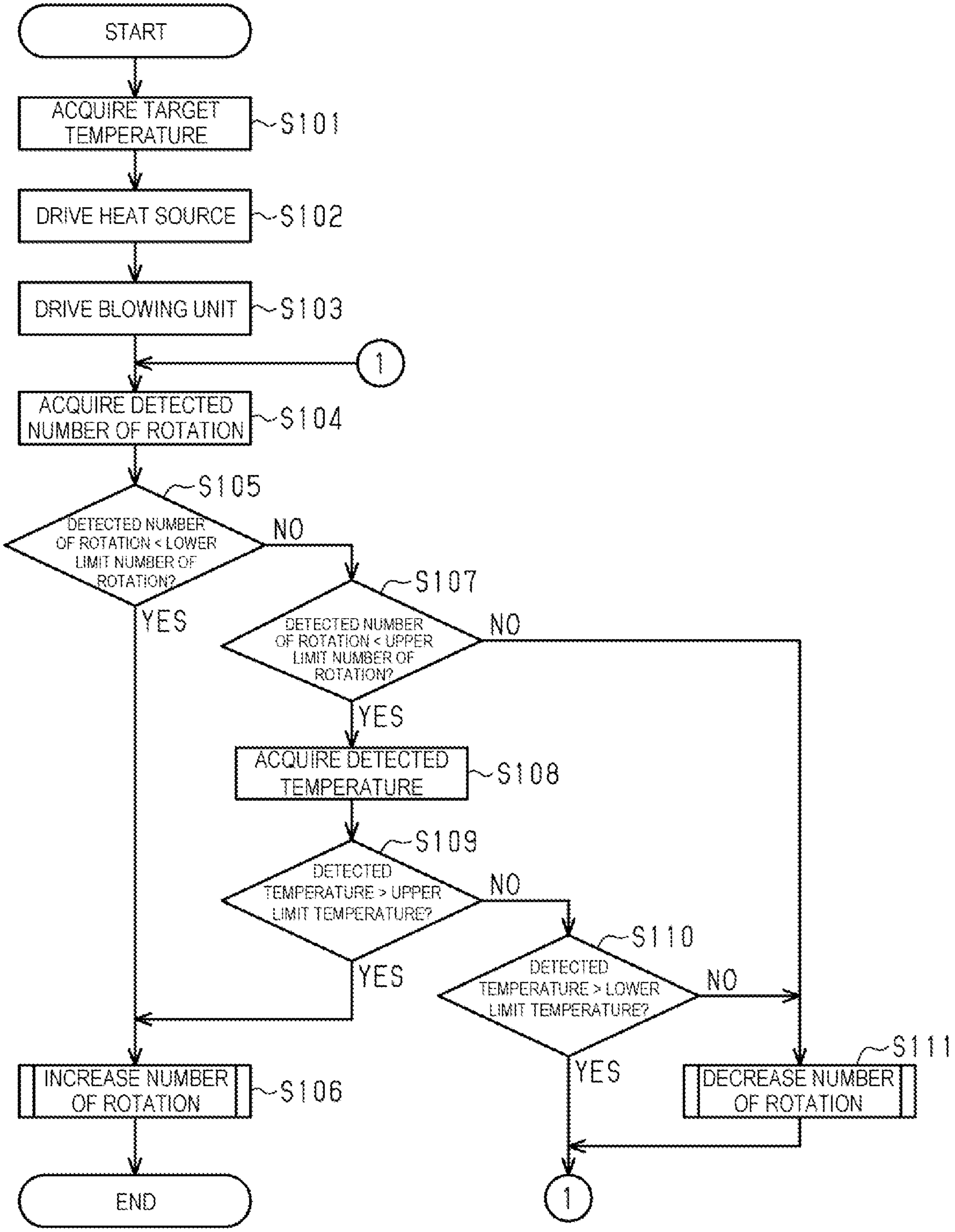
FIG. 4 is a flowchart illustrating a drying routine.

As illustrated in FIG. 4, the control unit 49 controls the number of rotations of the blowing unit 39 based on the output of the number of rotations detecting unit 47 in a state in which a constant power is applied to the heat source 38. The control unit 49 may set a constant power applied to the heat source 38 in accordance with the target temperature of the wind supplied by the heated air blower 35. Specifically, the control unit 49 may set the applied power applied to the heat source 38 to an applied power corresponding to the target temperature as illustrated in Table 1, and control the number of rotations of the blowing unit 39 such that the number of rotations reaches the reference number of rotations corresponding to the target temperature.

The control unit 49 may control the number of rotations of the blowing unit 39 based on the detected value of current detected by the current detecting unit 46. For example, when increasing or decreasing the number of rotations of the blower unit 39, the control unit 49 may wait until the detected value of current changes by the predetermined value or more before acquiring a detected number of rotations.

The control unit 49 may control the number of rotations of the blowing unit 39 based on the output of the temperature detecting unit 36. When the detected temperature output from the temperature detecting unit 36 is higher than the upper limit temperature, the control unit 49 may increase the number of rotations of the blower unit 39. When the detected temperature is lower than the lower limit temperature, the control unit 49 may decrease the number of rotations of the blowing unit 39.

The control unit 49 may set the number of rotations of the blowing unit 39 for each of the compartments 33. The control unit 49 may apply current of the same magnitude to the plurality of blowing units 39 housed in one compartment 33. Of the plurality of blowing units 39, the control unit 49 may acquire the detected number of rotations of one blowing unit 39, and set the number of rotations of other blowing units 39 housed in the other compartments 33 based on this detected number of rotations.

The control unit 49 may monitor the state of the blowing unit 39 based on the output of the number of rotations detecting unit 47 and the value of applied current applied to the blowing unit 39. For example, deterioration of the blowing unit 39 may make it difficult to increase the number of rotations even when the value of applied current is increased. For example, in a case in which the number of rotations is smaller than the lower limit value of rotation even when current having the maximum value of current is applied to the blowing unit 39, the control unit 49 may stop driving the heated air blower 35.

Advantageous effects of the present embodiment will be described.

(1) The temperature of the wind supplied by the heated air blower 35 changes depending on the amount of heat generated by the heat source 38, and the wind speed of the wind supplied by the blowing unit 39. The control unit 49 controls the number of rotations of the blowing unit 39 based on the output of the number of rotations detecting unit 47. In other words, by controlling this number of rotations based on the actual number of rotations of the blowing unit 39, the control unit 49 can accurately adjust the temperature of the wind supplied by the heated air blower 35, and reliably dry the recording medium 19.

(2) The drying mechanism 18 includes a plurality of heated air blowers 35 aligned in the width direction X. Accordingly, the drying mechanism 18 can dry a recording medium 19 having a large width.

(3) The temperature detecting unit 36 detects the temperature of the wind supplied by the heated air blower 35 or the temperature of the heated air blower 35. Since the control unit 49 controls the number of rotations of the blowing unit 39 based on the actual temperature of the wind or the heated air blower 35, the control unit 49 can more accurately adjust the temperature of the wind supplied by the heated air blower 35.

(4) The drying mechanism 18 includes a plurality of compartments 33 aligned in the width direction X. Each of the compartments 33 houses a heated air blower 35 and a temperature detecting unit 36. Accordingly, the drying mechanism 18 can detect the temperature for each of the compartments 33, and supply wind having reduced temperature variation from the plurality of compartments 33.

(5) The control unit 49 sets the number of rotations of the blowing unit 39 for each of the compartments 33. Therefore, the control unit 49 can collectively control a plurality of blowing units 39 housed in one compartment 33, which makes it possible to reduce the control load compared to a case in which the blowing units 39 are individually controlled.

(6) The control unit 49 sets a constant power applied to the heat source 38 in accordance with the target temperature of wind. Accordingly, the adjustable range of temperature can be widened.

(7) The current detecting unit 46 detects the value of current flowing through the heated air blower 35. The number of rotations of the blowing unit 39 changes depending on the value of current flowing through the heated air blower 35. Therefore, the control unit 49 can more accurately control the number of rotations of the blowing unit 39 by using the detected value of current detected by the current detecting unit 46.

(8) The control unit 49 can more accurately adjust the temperature and wind speed of the wind supplied by the heated air blower 35 by using the output of the temperature detecting unit 36 and the detected value of current detected by the current detecting unit 46.

(9) For example, deterioration of the blowing unit 39 may make it difficult to increase the number of rotations relative to the value of applied current. In this regard, since the control unit 49 monitors the state of the blowing unit 39 based on the output of the number of rotations detecting unit 47 and the value of applied current applied to the blowing unit 39, the control unit 49 can detect deterioration of the blowing unit 39.

The present embodiment may be modified and carried out as follows. The present embodiment and modified examples thereof to be described below may be carried out in combination as long as no technical contradiction arises.

The control unit 49 may store a normal number of rotations of the blowing unit 39 in association with the value of applied current applied to the blowing unit 39. The control unit 49 may compare the value of applied current applied to the blowing unit 39 and the detected number of rotations detected by the number of rotations detecting unit 47 at any timing, such as when the recording device 11 is powered on, and when the recording device 11 is powered off.

The recording device 11 may include no current detecting unit 46. The control unit 49 may control the number of rotations of the blowing unit 39 based on the output of the number of rotations detecting unit 47 and the output of the temperature detecting unit 36. In the drying routine, steps S201, S202, S208, and S209 illustrated in FIG. 5, as well as steps S301, S302, S304, and S305 illustrated in FIG. 6 may be omitted.

The recording device 11 may include no temperature detecting unit 36. The control unit 49 may control the number of rotations of the blowing unit 39 based on the output of the number of rotations detecting unit 47 and the detected value of current detected by the current detecting unit 46. In the drying routine, when the determination in step S107 is YES, the processing may be moved to step S104, with steps S108 to S110 illustrated in FIG. 4 omitted.

The recording device 11 may include neither a current detecting unit 46 nor a temperature detecting unit 36. The control unit 49 may control the number of rotations by comparing the detected number of rotations detected by the number of rotations detecting unit 47 and the reference number of rotations.

The control unit 49 may apply a constant power to the heat source 38 regardless of the target temperature of the wind supplied by the heated air blower 35.

The control unit 49 may individually set the number of rotations of the plurality of blowing units 39 housed in the compartment 33.

The drying mechanism 18 may include one compartment 33.

The compartment 33 may house a plurality of temperature detecting units 36.

The temperature detecting unit 36 may detect the temperature of the heated air blower 35. For example, the temperature detecting unit 36 may detect the temperature of the cylinder 40.

The plurality of heated air blowers 35 aligned in the width direction X may be provided shifted from each other in the transport direction D1.

The recording device 11 may be a liquid ejecting device that performs recording by ejecting or discharging liquid other than ink. Examples of the state of liquid discharged as a micro amount of droplets from the liquid ejecting device shall be understood to include a granular-shaped state, a teardrop-shaped state, and a trailing thread-shaped state. It is only required that liquid herein is a material capable of being ejected from the liquid ejecting device. For example, it is only required that liquid is a substance in the liquid phase. Examples of liquid shall be understood to include fluids such as liquid material having high or low viscosity, sols, gel water, other inorganic solvents, organic solvents, solutions, liquid resin, liquid metals, and metal melts. Liquid shall be understood to include not only liquid as a state of a substance, but also particles of a functional material made of a solid such as pigment or metal particles that are dissolved, dispersed, or mixed in a solvent. Exemplary examples of liquid include ink, liquid crystal, and the like as described in the embodiment described above. Here, ink shall be understood to encompass common aqueous ink and oil-based ink, as well as various liquid compounds such as gel ink and hot-melt ink. Specific examples of the liquid ejecting device include, for example, devices that eject liquid containing a material such as an electrode material or a color material used in the manufacture of liquid crystal displays, electroluminescence displays, surface emitting displays, color filters, and the like in a dispersed or dissolved form. The liquid ejecting device may be a device that ejects bioorganic substances used for biochip manufacturing, a device that is used as a precision pipette and that ejects liquid serving as a sample, a textile printing device, a micro dispenser, or the like. The liquid ejecting device may be a device that ejects lubricant to precision machines such as watches or cameras in a pinpoint manner, or a device that ejects transparent resin liquid such as ultraviolet curing resin on substrates for forming micro half ball lenses, optical lenses, or the like used for optical communication elements and the like. The liquid ejecting device may be a device that ejects an etchant such as an acid or an alkali to etch a substrate or the like.

Hereinafter, technical concepts as well as actions and effects thereof that are understood from the above-described embodiment and modified examples will be described.

(A) A recording device includes: a recording unit configured to perform recording by causing liquid to adhere to a recording medium; a support unit configured to support the recording medium subjected to printing and transported in a transport direction; a drying mechanism including a heated air blower including a heat source and a blowing unit; a number of rotations detecting unit configured to detect a number of rotations of the blowing unit that blows air to the heat source; and a control unit configured to control the drying mechanism; wherein the support unit and the heated air blower are disposed sandwiching a transport path of the recording medium at a position downstream of the recording unit in the transport direction and the control unit controls the number of rotations of the blowing unit based on an output of the number of rotations detecting unit in a state in which a constant power is applied to the heat source.

The temperature of the wind supplied by the heated air blower changes depending on the amount of heat generated by the heat source, and the wind speed of the wind supplied by the blowing unit. According to this configuration, the control unit controls the number of rotations of the blowing unit based on the output of the number of rotations detecting unit. In other words, by controlling this number of rotations based on the actual number of rotations of the blowing unit, the control unit can accurately adjust the temperature of the wind supplied by the heated air blower, and reliably dry the recording medium.

(B) In the recording device, the drying mechanism may include a plurality of the heated air blowers, and the plurality of heated air blowers may be aligned in a width direction intersecting the transport direction.

According to this configuration, the drying mechanism includes a plurality of heated air blowers aligned in the width direction. Accordingly, the drying mechanism can dry a recording medium having a large width.

(C) The recording device may further include a temperature detecting unit configured to detect a temperature of wind supplied by the heated air blower or a temperature of the heated air blower, and the control unit may control the number of rotations of the blowing unit based on the output of the number of rotations detecting unit and an output of the temperature detecting unit.

According to this configuration, the temperature detecting unit detects the temperature of the wind supplied by the heated air blower or the temperature of the heated air blower. Since the control unit controls the number of rotations of the blowing unit based on the actual temperature of the wind or the heated air blower, the control unit can more accurately adjust the temperature of the wind supplied by the heated air blower.

(D) In the recording device, the drying mechanism may include a plurality of compartments aligned in a width direction intersecting the transport direction, and each of the plurality of compartments may house the heated air blower and the temperature detecting unit.

According to this configuration, the drying mechanism includes a plurality of compartments aligned in the width direction. Each of the compartments houses a heated air blower and a temperature detecting unit. Accordingly, the drying mechanism can detect the temperature for each of the compartments, and supply wind having reduced temperature variation from the plurality of compartments.

(E) In the recording device, each of the plurality of compartments may house a plurality of the heated air blowers, and the control unit may set the number of rotations of the blowing unit for each of the compartments.

According to this configuration, the control unit sets the number of rotations of the blowing unit for each of the compartments. Therefore, the control unit can collectively control a plurality of blowing units housed in one compartment, which makes it possible to reduce the control load compared to a case in which the blowing units are individually controlled.

(F) In the recording device, the control unit may set the constant power applied to the heat source in accordance with a target temperature of wind supplied by the heated air blower.

According to this configuration, the control unit sets a constant power applied to the heat source in accordance with the target temperature of wind. Accordingly, the adjustable range of temperature can be widened.

(G) The recording device may further include a current detecting unit configured to detect a value of current flowing through the heated air blower, and the control unit may control the number of rotations of the blowing unit based on the output of the number of rotations detecting unit and a detected value of current detected by the current detecting unit.

According to this configuration, the current detecting unit detects the value of current flowing through the heated air blower. The number of rotations of the blowing unit changes depending on the value of current flowing through the heated air blower. Therefore, the control unit can more accurately control the number of rotations of the blowing unit by using the detected value of current detected by the current detecting unit.

(H) The recording device may further include a current detecting unit configured to detect a value of current flowing through the heated air blower, and the control unit may control the number of rotations of the blowing unit based on the output of the number of rotations detecting unit, the output of the temperature detecting unit, and a detected value of current detected by the current detecting unit.

According to this configuration, the control unit can more accurately adjust the temperature and wind speed of the wind supplied by the heated air blower by using the output of the temperature detecting unit and the detected value of current detected by the current detecting unit.

(I) In the recording device, the control unit may monitor a state of the blowing unit based on the output of the number of rotations detecting unit and a value of applied current applied to the blowing unit.

For example, deterioration of the blowing unit may make it difficult to increase the number of rotations relative to the value of applied current. In this regard, according to this configuration, since the control unit monitors the state of the blowing unit based on the output of the number of rotations detecting unit and the value of applied current applied to the blowing unit, the control unit can detect deterioration of the blowing unit.

What is claimed is:

1. A recording device comprising:

a recording unit configured to perform recording by causing liquid to adhere to a recording medium;

a support unit configured to support the recording medium subjected to printing and transported in a transport direction;

a drying mechanism including a heated air blower including a heat source and a blowing unit;

a number of rotations detecting unit configured to detect a number of rotations of the blowing unit that blows air to the heat source;

a temperature detecting unit configured to detect a temperature of wind supplied by the heated air blower or a temperature of the heated air blower; and a control unit configured to control the drying mechanism; wherein the support unit and the heated air blower are disposed sandwiching a transport path of the recording medium at a position downstream of the recording unit in the transport direction, the control unit controls the number of rotations of the blowing unit based on an output of the number of rotations detecting unit in a state in which a constant power is applied to the heat source, the control unit controls the number of rotations of the blowing unit based on the output of the number of rotations detecting unit and an output of the temperature detecting unit, the drying mechanism includes a plurality of compartments aligned in a width direction intersecting the transport direction and each of the plurality of compartments houses the heated air blower and the temperature detecting unit.

2. The recording device according to claim 1, wherein the drying mechanism includes a plurality of the heated air blowers and the plurality of heated air blowers are aligned in a width direction intersecting the transport direction.

3. The recording device according to claim 1, wherein each of the plurality of compartments houses a plurality of the heated air blowers and the control unit sets the number of rotations of the blowing unit for each of the compartments.

4. The recording device according to claim 1, wherein the control unit sets the constant power applied to the heat source in accordance with a target temperature of wind supplied by the heated air blower.

5. The recording device according to claim 1, further comprising:

a current detecting unit configured to detect a value of current flowing through the heated air blower; wherein the control unit controls the number of rotations of the blowing unit based on the output of the number of rotations detecting unit and a detected value of current detected by the current detecting unit.

6. The recording device according to claim 1, further comprising:

a current detecting unit configured to detect a value of current flowing through the heated air blower; wherein the control unit controls the number of rotations of the blowing unit based on the output of the number of rotations detecting unit, the output of the temperature detecting unit, and a detected value of current detected by the current detecting unit.

7. The recording device according to claim 1, wherein the control unit monitors a state of the blowing unit based on the output of the number of rotations detecting unit and a value of applied current applied to the blowing unit.

* * * * *